A motor includes a bus bar assembly including a resin holder and a wire integrally provided in the resin holder. The wire is connected to an external power supply and a coil leading-out wire of the motor, the resin holder is provided with a positioning hole penetrating in an axial direction, and at least a portion of the wire is exposed from the positioning hole. The wire is integrally provided in the resin holder simply through the positioning hole, and thus the resulting bus bar assembly is low in cost and light in weight.

9 Claims, 3 Drawing Sheets

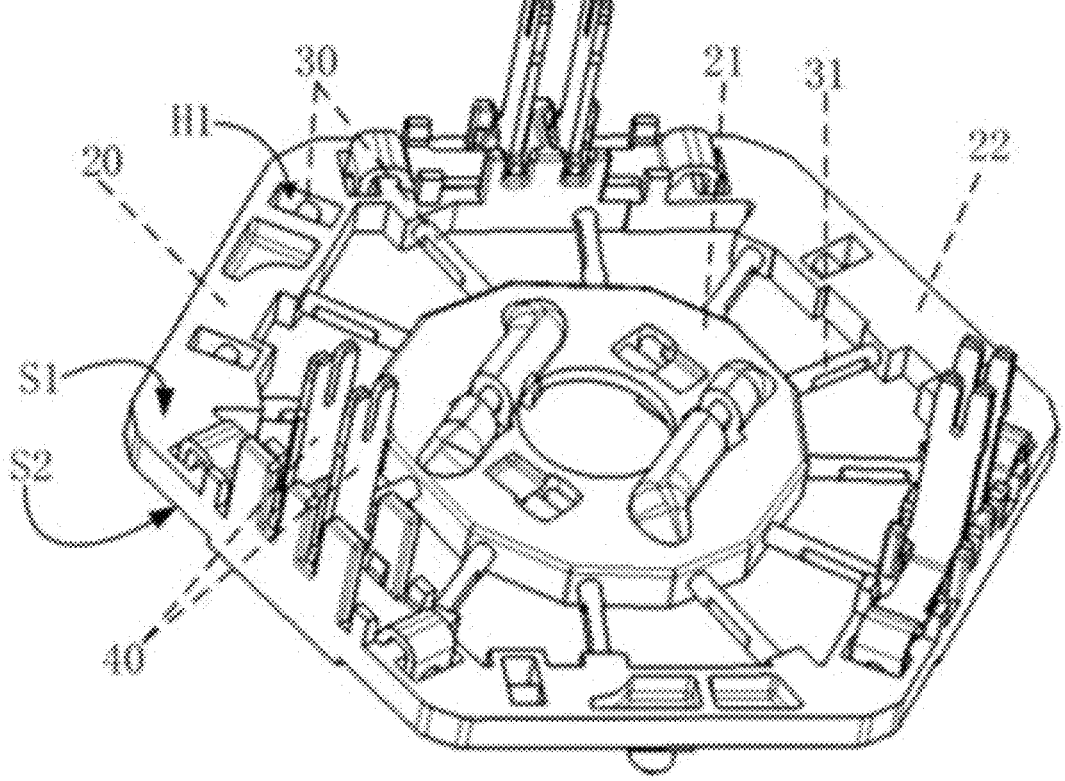

MOTOR AND ELECTRICAL PRODUCT

CROSS-REFERENCE TO RELATED APPLICATIONS

The present application claims priority under 35 U.S.C. § 119 to CN Patent Application No. 202210845888, filed on Jul. 19, 2022, the entire contents of which is hereby incorporated herein by reference.

1. FIELD OF THE INVENTION

The present disclosure relates to the electromechanical field, in particular to a motor and an electrical product.

2. BACKGROUND

In the prior art, an electric power steering (EPS) motor is equipped with a bus bar assembly, the bus bar assembly being generally formed integrally from a resin holder and a plate-shaped bus bar.

It should be noted that the above introduction to the technical background is only for the convenience of a clear and complete description of the technical solutions of the present disclosure, and for the convenience of understanding by those skilled in the art. It cannot be considered that the above technical solutions are known to those skilled in the art just because these solutions are described in the background section of the present disclosure.

The inventors have discovered that use of a plate-shaped bus bar results in high cost, and heavy weight of a motor.

SUMMARY

According to an example embodiment of the present disclosure, a motor includes a bus bar assembly including a resin holder and a wire integrally provided in the resin holder. The wire is connected to an external power supply and a coil leading-out wire of the motor, the resin holder is provided with a positioning hole penetrating axially, and at least a portion of the wire is exposed from the positioning hole.

In some example embodiments, the resin holder includes a central portion and an outer peripheral portion located around the central portion, the wire includes a connecting portion to connect the outer peripheral portion and the central portion, and the coil leading-out wire is connected to the connecting portion.

In some example embodiments, the connecting portion extends in a straight line shape, and is cross-connected to the coil leading-out wire.

In some example embodiments, the connection position between the coil leading-out wire and the connecting portion is located between an axial upper surface and an axial lower surface of the resin holder.

In some example embodiments, the bus bar assembly further includes a plate-shaped power supply terminal, one end of the plate-shaped power supply terminal is connected to the external power supply, the other end of the plate-shaped power supply terminal is electrically connected to the wire, and the connection position is located between the axial upper surface and the axial lower surface of the resin holder.

In some example embodiments, the other end of the plate-shaped power supply terminal is U-shaped, the resin holder is provided with a retaining hole penetrating axially, and the other end of the plate-shaped power supply terminal is inserted into the retaining hole, and the wire is connected to the other end of the plate-shaped power supply terminal in the retaining hole.

In some example embodiments, at least a portion of the cross section of at least a portion of the wire is arc-shaped.

In some example embodiments, the bus bar assembly includes a plurality of the wires, at most two of which in the axial direction are laminated in a manner of insulating from each other.

In some example embodiments, the junction between the wire and the coil leading-out wire is planar.

In some example embodiments, the bus bar assembly includes the wires which are laminated in the axial direction, an inner side surface of the resin holder includes an upper-layer wire supporting surface close to an intersection position of the wires, which supports the wire close to an opening side of the motor towards the opening side of the motor, an outer side surface of the resin holder includes a lower-layer wire supporting surface close to the intersection position of the wires, which supports the wire away from the opening side of the motor toward the inner side of the motor, and the intersection portions of the wires is filled with resin in the axial direction.

According to another example embodiment of the present disclosure, an electrical product is provided. The electrical product includes the motor described in any of the foregoing example embodiments.

With reference to the following description and accompanying drawings, specific example embodiments of the present disclosure are disclosed in detail to indicate a manner in which the principles of the present disclosure may be used. It should be understood that the example embodiments of the present disclosure are not limited in scope. Example embodiments of the present disclosure encompass many changes, modifications and equivalents within the scope of the terms of the appended claims.

Features described and/or illustrated with respect to one example embodiment may be used in the same or similar manner in one or more other example embodiments, in combination with, or instead of features in other example embodiments.

It should be emphasized that the term "include/comprise" when used herein refers to the presence of a feature, integer, step or assembly, but does not exclude the presence or addition of one or more other features, integers, steps or assemblies.

The above and other elements, features, steps, characteristics and advantages of the present disclosure will become more apparent from the following detailed description of the example embodiments with reference to the attached drawings.

BRIEF DESCRIPTION OF THE DRAWINGS

Elements and features described in one accompanying drawing or one example embodiment of example embodiments of the present disclosure may be combined with elements and features shown in one or more other accompanying drawings or example embodiments. Furthermore, in the accompanying drawings, like numerals indicate corresponding components in the several accompanying drawings and may be used to indicate corresponding components used in more than one example embodiment.

The included accompanying drawings are used to provide a further understanding of the example embodiments of the present disclosure, which constitute a part of the description to illustrate the example embodiments of the present disclosure, and explain the principle of the present disclosure together with the text description. Apparently, the accompanying drawings in the following description are only some example embodiments of the present disclosure, and those of ordinary skill in the art can obtain other accompanying drawings according to these drawings without creative efforts. In drawings.

DETAILED DESCRIPTION

Figure 1:
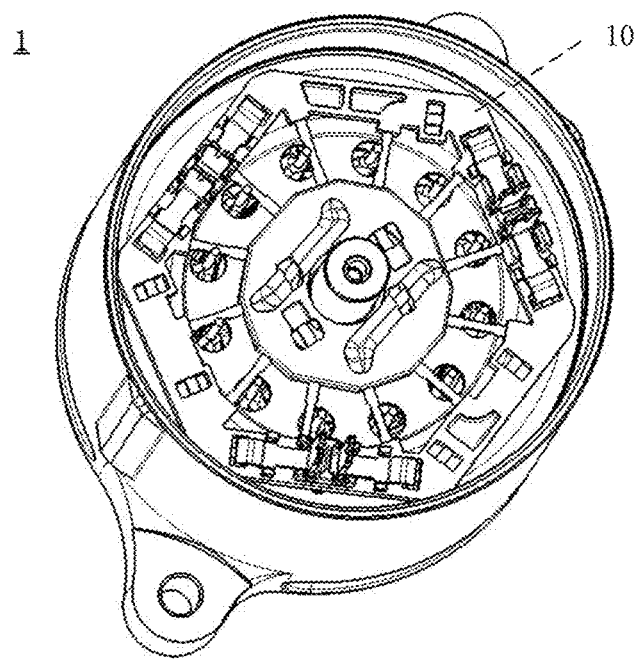
FIG. 1 is a schematic diagram of an example of a motor according to an example embodiment of the present disclosure.

The foregoing and other features of the present disclosure will become apparent from the following description with reference to the accompanying drawings. In the description and accompanying drawings, specific example embodiments of the present disclosure are disclosed, which indicate some example embodiments in which the principles of the present disclosure can be adopted. It should be understood that the present disclosure is not limited to the described example embodiments. On the contrary, the present disclosure includes all modifications, variations and equivalents that fall within the scope of the appended claims. Various example embodiments of the present disclosure will be described below with reference to the accompanying drawings. These example embodiments are only exemplary, but not intended to limit the present disclosure.

In the example embodiments of the present disclosure, the terms "upper", "lower", etc. are used to distinguish different elements from the names, but do not indicate a spatial arrangement or chronological order of these elements, etc., and these elements should not be limited by these terms. The term "and/or" includes any one and all combinations of one or more of the associated listed terms. The terms "comprising", "including", "having" and the like refer to the presence of stated features, elements, component or assemblies, but do not exclude the presence or addition of one or more other features, elements, components or assemblies.

In the example embodiments of the present disclosure, the singular forms "a", "this" and the like include plural forms, which should be broadly understood as "one" or "a class" and not limited to the meaning of "one". In addition, the term "the" should be understood to include both the singular form and the plural form, unless the context clearly dictates otherwise. Furthermore, the term "according to" should be understood as "at least in part according to . . . "; and the term "based on" should be understood as "at least in part based on . . . ", unless the context clearly indicates otherwise.

In addition, in the following description of the example embodiments of the present disclosure, for the convenience of description, a direction extending along a central axis of a motor or a direction parallel to this direction is referred to as an "axial direction"; a radius direction centered on the central axis is referred to as a "radial direction"; a direction around the central axis is referred to as a "circumferential direction"; a side away from the central axis in the radius direction is referred to as a "radial outer side"; a side close to the central axis in the radius direction is referred to as a "radial inner side"; a surface close to the central axis or an opening side of the motor is referred to as an "inner side surface"; and a surface away from the central axis or the opening side of the motor is referred to as an "outer side surface". However, it is worth noting that these are for illustrative convenience only and do not limit the orientation of the motor when used and manufactured.

The example embodiments of the present disclosure will be described below with reference to the accompanying drawings.

Example Embodiment of the First Aspect

The example embodiment of the present disclosure provides a motor.

FIG. 1 is a schematic diagram of an example of a motor 1 according to an example embodiment of the present disclosure. As shown in FIG. 1, the motor 1 in the example embodiment of the present disclosure includes a bus bar assembly 10.

Figure 2:
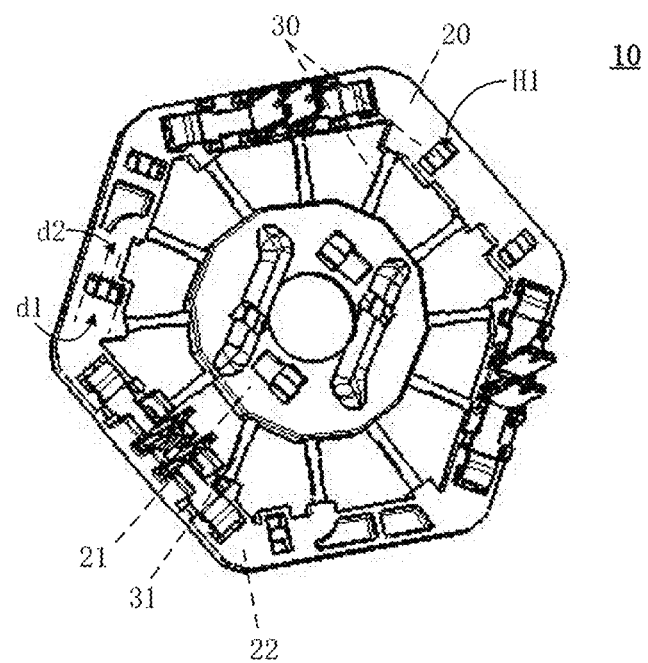
FIG. 2 is a schematic diagram from one perspective of a bus bar assembly of the motor shown in FIG. 1.
Figure 3:
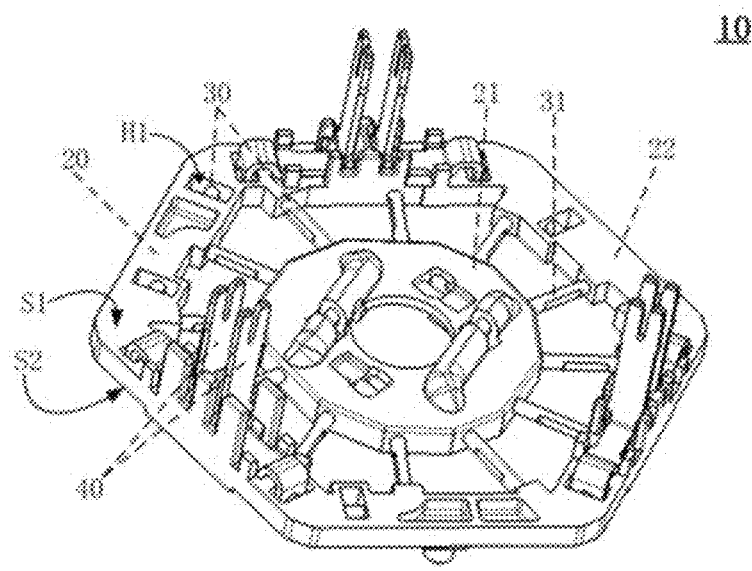
FIG. 3 is a schematic diagram from another perspective of the bus bar assembly of the motor shown in FIG. 1.

FIG. 2 is a schematic diagram from one perspective of the bus bar assembly 10 of the motor 1 shown in FIG. 1. FIG. 3 is a schematic diagram from another perspective of the bus bar assembly 10 of the motor 1 shown in FIG. 1. As shown in FIG. 2 and FIG. 3, the bus bar assembly 10 includes a resin holder 20 and a wire 30 integrally formed in the resin holder 20, wherein the wire 30 is connected to an external power supply and a coil leading-out wire of the motor 1. In the example embodiment of the present disclosure, as shown in FIG. 2 and FIG. 3, the resin holder is provided with a positioning hole H1 that is penetrated in the axial direction, and at least part of the wire 30 is exposed from the positioning hole H1.

Therefore, the wire 30 is integrally formed in the resin holder 20 simply through the positioning hole H1, and thus the resulting bus bar assembly 10 is low in cost and light in weight.

In the example embodiment of the present disclosure, as shown in FIG. 2, a width d1 of the positioning hole H1 may be greater than a width d2 of the wire 30. Here, the widths d1 and d2 refer to a width on a plane perpendicular to the axial direction in a direction perpendicular to an extension direction of the wire 30 exposed from the positioning hole H1, respectively. Therefore, it is possible to ensure an operation space of a tool for clamping the wire 30, which is easy to form the resin holder 20. The present disclosure is not limited thereto. When other clamping tools are used, or other methods are used to position the wire 30, the width d1 of the positioning hole H1 may not be greater than the width d2 of the wire 30.

In some example embodiments, as shown in FIG. 2 and FIG. 3, the resin holder 20 includes a central portion 21 and an outer peripheral portion 22 disposed around the central portion 21, the wire 30 includes a connecting portion 31 for connecting the outer peripheral portion 22 and the central portion 21, and the coil leading-out wire of the motor 1 is connected to the connecting portion 31. Therefore, a sufficient connection work space can be ensured, and the weight of the bus bar assembly 10 can be reduced.

In some example embodiments, as shown in FIG. 2 and FIG. 3, the connecting portion 31 extends in a straight line shape and is cross-connected to the coil leading-out wire of the motor. For example, the coil leading-out wire of the motor extends in the axial direction, and the connecting portion 31 of the wire 30 extends on a plane perpendicular to the axial direction. As a result, the connection between the coil leading-out wire of the motor and the wire 30 is facilitated, and the electrical conductivity between the wire 30 and the coil leading-out wire of the motor is ensured.

In some example embodiments, the connection position between the coil leading-out wire of the motor and the connecting portion 31 is located between an axial upper surface and an axial lower surface of the resin holder 20 (e.g., an axial upper surface S1 and an axial lower surface S2 of the resin holder 20 as shown in FIG. 3). Therefore, the connection position between the coil leading-out wire of the motor and the connecting portion 31 does not occupy an axial space, thereby reducing an axial dimension of the bus bar assembly 10, and facilitating welding of the coil leading-out wire and the wire 30.

In some example embodiments, as shown in FIG. 3, the bus bar assembly 10 further includes a plate-shaped power supply terminal 40, wherein one end of the plate-shaped power supply terminal 40 is connected to an external power supply (not shown), the other end of the plate-shaped power supply terminal 40 is electrically connected to the wire 30, and the connection position therebetween is located between the axial upper surface and the axial lower surface of the resin holder 20. Therefore, the connection position between the power supply terminal and the wire does not occupy an axial direction, thereby reducing the axial dimension of the bus bar assembly.

Figure 4:
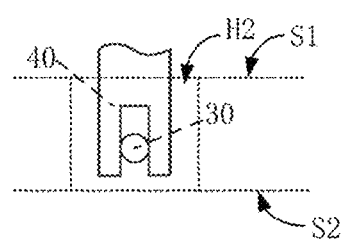
FIG. 4 is a schematic diagram of a connection mode of the U-shaped other end of a plate-shaped power supply terminal and a wire.

In some example embodiments, the above-mentioned other end of the plate-shaped power supply terminal 40 is U-shaped. FIG. 4 is a schematic diagram of a connection mode of the U-shaped other end of the plate-shaped power supply terminal and the wire. As shown in FIG. 4, the resin holder 20 is also provided with a retaining hole H2 which is penetrated in the axial direction (a vertical direction shown in FIG. 4). The above-mentioned other end of the plate-shaped power supply terminal 40 is inserted into the retaining hole H2, and the wire 30 is connected to the above-mentioned other end of the plate-shaped power supply terminal 40 in the retaining hole H2. Therefore, it is prone to the positioning connection between the plate-shaped power supply terminal 40 and the wire 30. In addition, the axial space is not occupied in the case of laser welding for connection, thereby further reducing the axial dimension of the bus bar assembly.

Figure 5:
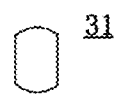
FIG. 5 is a schematic diagram of a cross section of a part of a connecting portion of the wire.

In some example embodiments, at least part of the cross section of at least part of the wire 30 is arc-shaped. For example, as shown in FIG. 3, an upper side and a lower side of a cross section in the middle of the connecting portion 31 of the wire 30 are arc-shaped, and this arc shape may be formed by using a tool to press both or one of the left and right sides of the connecting portion 31 of the wire 30, or formed in other ways. FIG. 5 is a schematic diagram of a cross section of the connecting portion 31 of the wire 30. Therefore, the connection between the wire 30 and the coil leading-out wire of the motor is facilitated.

In the example embodiment of the present disclosure, the bus bar assembly 10 may include a plurality of wires 30, e.g., include three wires 30. In some example embodiments, at most two wires 30 in the axial direction are laminated each other. The two wires 30 which are laminated each other are filled with resin in the axial direction, so as to ensure the insulation between the wires 30. Therefore, the axial dimension of the bus bar assembly can be further reduced since at most two wires 30 are laminated in the axial direction.

In some example embodiments, the junction between the wire 30 and the coil leading-out wire of the motor is planar. As shown in FIG. 3, the junction between the connecting portion 31 of the wire 30 and the coil leading-out wire of the motor (the left and right sides of the connecting portion 31) are planar. Therefore, the connection between the wire 30 and the coil leading-out wire of the motor is facilitated.

Figure 6:
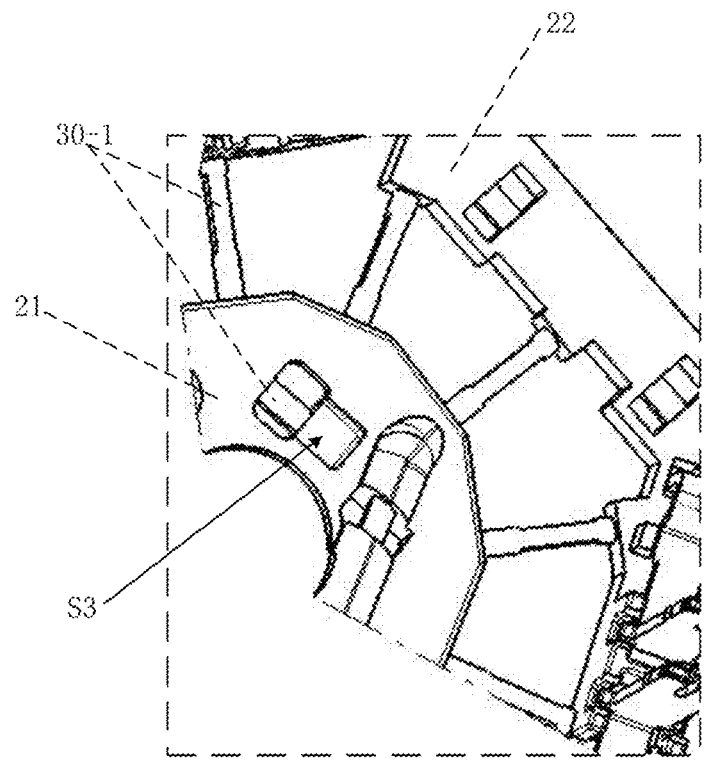
FIG. 6 is a partially enlarged schematic diagram of the bus bar assembly.
Figure 7:
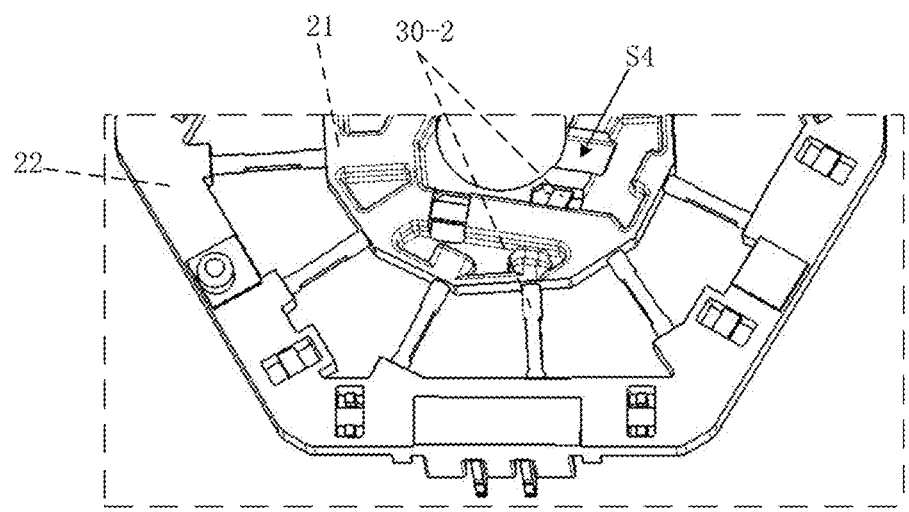
FIG. 7 is another partially enlarged schematic diagram of the bus bar assembly.

FIG. 6 is a partially enlarged schematic diagram of the bus bar assembly 10, showing a case of observing the resin holder 20 from the inner side surface of the resin cage 20. FIG. 7 is another partially enlarged schematic diagram of the bus bar assembly 10, showing a case of observing the resin holder 20 from the outer side surface of the resin holder.

In some example embodiments, as shown in FIG. 6 and FIG. 7, the bus bar assembly 10 includes wires 30 which are laminated in the axial direction. An inner side surface (i.e., a surface close to the opening side of the motor) of the resin holder 20 has an upper-layer wire supporting surface S3 close to the intersection position of the wires 30, which supports the wire 30-1 close to the opening side of the motor towards the opening side of the motor; an outer side surface of the resin holder 20 (i.e., a surface away from the opening side of the motor) has a lower-layer wire supporting surface S4 close to the intersection position of the wire 30, which supports the wire 30-2 away from the opening side of the motor toward the inner side of the motor; and the intersection position between the wire 30-1 and the wire 30-2 is filled with resin in the axial direction. Therefore, when the bus bar assembly 10 is formed, a supporting surface S3 and a supporting surface S4 can be supported with the help of a tool to ensure that the wires 30 does not make a contact with each other, thereby meeting the insulation requirements.

It is worth noting that the above is only an exemplary description of the composition and structure of the motor related to the present disclosure, but the present disclosure is not limited thereto, and appropriate modifications can also be made on the basis of the above example embodiments. In addition, the above content only exemplarily describes respective components, but the present disclosure is not limited thereto, and the specific content of the respective components can also refer to related technologies. The motor may also include other components, such as a rotor, a stator, a bearing, a casing, etc. For details, reference may be made to related technologies, which will be omitted here.

According to the motor in the example embodiment of the present disclosure, the wire is integrally formed in the resin holder simply through the positioning hole. Therefore, the resulting bus bar assembly is low in cost and light in weight.

Example Embodiment of the Second Aspect

An example embodiment of the present disclosure provides an electrical product. The electrical product includes the motor 1 described in the foregoing example embodiment of the first aspect. Since the structure of the motor 1 has been described in detail in the example embodiment of the first aspect, its content is incorporated here, which will be omitted here.

In the example embodiment of the present disclosure, the electrical product may be any electrical equipment provided with a motor, for example, may be an indoor unit of an air conditioner, an outdoor unit of the air conditioner, a water dispenser, a washing machine, a sweeper, a compressor, a blower, a mixer, or other household appliances; or a pump, a conveyor, an elevator, a standard industrial general machine, a wind generator, a grinder, a traction motor, or various information processing equipment or various information processing equipment; or various components of automobiles, such as an automotive electric power steering system and a braking system.

The present disclosure is described above in conjunction with example embodiments, but those skilled in the art should be clear that these descriptions are exemplary and are not intended to limit the protection scope of the present disclosure. Those skilled in the art can make various variations and modifications to the present disclosure according to the spirit and principles of the present disclosure, and these variations and modifications are also within the scope of the present disclosure.

The preferred example embodiments of the present disclosure are further described above with reference to the accompanying drawings. Many features and advantages of these example embodiments are clear according to the detailed description. Therefore, the accompanying claims are intended to cover all these features and advantages that fall within the true spirit and scope of these example embodiments. Furthermore, since those skilled in the art is prone to think of many modifications and changes, it is not intended to limit the example embodiments of the prevent disclosure to the precise structure and operations shown and described, but to cover all suitable modifications and equivalents that fall within its scope.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
a bus bar assembly including a resin holder and a wire integrally provided in the resin holder; wherein
the wire is connected to an external power supply and a coil leading-out wire of the motor;
the resin holder is provided with a positioning hole penetrating in an axial direction;
at least a portion of the wire is exposed from the positioning hole;
the resin holder includes a central portion and an outer peripheral portion surrounding the central portion;
the wire includes a connecting portion to connect the outer peripheral portion and the central portion, the central portion and the outer peripheral portion are connected to one another only through the connecting portion of the wire; and
the coil leading-out wire is connected to the connecting portion.

2. The motor according to claim 1, wherein the connecting portion extends in a straight line shape, and is cross-connected with the coil leading-out wire.

3. The motor according to claim 1, wherein the connection position between the coil leading-out wire and the connecting portion is located between an axial upper surface and an axial lower surface of the resin holder.

4. The motor according to claim 1, wherein
the bus bar assembly further includes a plate-shaped power supply terminal, one end of the plate-shaped power supply terminal being connected to the external power supply and another end of the plate-shaped power supply terminal being electrically connected to the wire; and
the connection position therebetween is located between the axial upper surface and the axial lower surface of the resin holder.

5. The motor according to claim 4, wherein
the other end of the plate-shaped power supply terminal is U-shaped;
the resin holder is provided with a retaining hole penetrating in the axial direction;
the other end of the plate-shaped power supply terminal is inserted into the retaining hole; and
the wire is connected to the other end of the plate-shaped power supply terminal in the retaining hole.

6. The motor according to claim 1, wherein at least a portion of a cross section of at least a portion of the wire is arc-shaped.

7. The motor according to claim 1, wherein the bus bar assembly includes a plurality of the wires.

8. The motor according to claim 1, wherein a junction between the wire and the coil leading-out wire is planar.

9. The motor according to claim 1, wherein
the bus bar assembly includes a plurality of the wires;
an inner side surface of the resin holder includes an upper-layer wire supporting surface close to an intersection position of the plurality of the wires, which supports the plurality of the wires close to an opening side of the motor towards the opening side of the motor;
an outer side surface of the resin holder includes a lower-layer wire supporting surface close to the intersection position of the plurality of the wires, which supports the plurality of the wires away from the opening side of the motor toward the inner side of the motor; and
the intersection position of the plurality of the wires is filled with resin in the axial direction.

* * * * *